US012607159B2

(12) United States Patent
Zeni et al.

(10) Patent No.: US 12,607,159 B2
(45) Date of Patent: Apr. 21, 2026

(54) GASEOUS FUEL SUPPLY SYSTEM FOR A CLEAN COMBUSTION ENGINE OF A VEHICLE

(71) Applicant: Volvo Truck Corporation, Gothenburg (SE)

(72) Inventors: Cristiano Zeni, Lyons (FR); Rafig Babayev, Gothenburg (SE); Tankai Zhang, Mölndal (SE)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 18/965,298

(22) Filed: Dec. 2, 2024

(65) Prior Publication Data

US 2025/0198370 A1 Jun. 19, 2025

(30) Foreign Application Priority Data

Dec. 13, 2023 (EP) .................................... 23216343

(51) Int. Cl.
*F02M 21/02* (2006.01)
*F02M 31/00* (2006.01)

(52) U.S. Cl.
CPC ...... *F02M 21/0206* (2013.01); *F02M 31/005* (2013.01)

(58) Field of Classification Search
CPC ......................... F02M 31/005; F02M 21/0206
See application file for complete search history.

(56) References Cited

U.S. PATENT DOCUMENTS

| | | | | |
|---|---|---|---|---|
| 5,092,281 | A | 3/1992 | Iwaki et al. | |
| 5,375,580 | A * | 12/1994 | Stolz | F02M 21/029 123/542 |
| 5,868,122 | A | 2/1999 | Gram et al. | |
| 7,367,312 | B1 | 5/2008 | Boyer et al. | |
| 9,995,258 | B2 | 6/2018 | Takeuchi et al. | |
| 11,639,691 | B2 | 5/2023 | Puran et al. | |
| 2008/0099002 | A1 | 5/2008 | Boyer et al. | |

(Continued)

FOREIGN PATENT DOCUMENTS

| | | | |
|---|---|---|---|
| CN | 106915235 | A | 7/2017 |
| CN | 107687379 | A | 2/2018 |

(Continued)

OTHER PUBLICATIONS

Certification of Correction for U.S. Pat. No. 5,092,281, dated Mar. 3, 1992.

(Continued)

*Primary Examiner* — Kevin A Lathers
(74) *Attorney, Agent, or Firm* — Withrow & Terranova, PLLC

(57) ABSTRACT

A gaseous fuel supply system for a clean combustion engine of a vehicle having a vehicle cooling system. The supply system comprises: a gaseous fuel tank storing pressurized gaseous fuel; at least a first supply line arranged to supply pressurized gaseous fuel from the gaseous fuel tank to the clean combustion engine; at least a first heat exchanging component arranged in the first supply line. The first heat exchanging component is arranged to transfer heat between a cooling fluid of the vehicle cooling system and the pressurized gaseous fuel in the first supply line.

18 Claims, 3 Drawing Sheets

(56) References Cited

U.S. PATENT DOCUMENTS

| | | | | |
|---|---|---|---|---|
| 2009/0114367 | A1 | 5/2009 | Handa | |
| 2014/0116375 | A1 | 5/2014 | Kim et al. | |
| 2014/0209070 | A1 * | 7/2014 | Gleeson | F28D 7/0008 123/543 |
| 2021/0131382 | A1 | 5/2021 | Manfrida et al. | |
| 2021/0301775 | A1 * | 9/2021 | Puran | F02M 21/023 |
| 2021/0372350 | A1 | 12/2021 | Seba et al. | |
| 2022/0260040 | A1 | 8/2022 | Malischewski et al. | |
| 2025/0297587 | A1 | 9/2025 | Matsuda | |

FOREIGN PATENT DOCUMENTS

| | | | | | |
|---|---|---|---|---|---|
| CN | 111336047 | A | | 6/2020 | |
| CN | 114183276 | A | | 3/2022 | |
| CN | 116344866 | A | | 6/2023 | |
| DE | 102010053498 | A1 | | 6/2012 | |
| DE | 102016220851 | A1 | | 4/2018 | |
| DE | 102018215847 | A1 | | 3/2020 | |
| DE | 102021131038 | A1 | | 6/2023 | |
| EP | 3168445 | A1 | | 5/2017 | |
| EP | 3578793 | B1 | | 12/2019 | |
| EP | 3578794 | A1 | | 12/2019 | |
| EP | 3885640 | A2 | | 9/2021 | |
| EP | 3915820 | A1 | | 12/2021 | |
| EP | 3885640 | A3 | | 1/2022 | |
| EP | 4245975 | A1 | | 9/2023 | |
| JP | 2017166424 | A | | 9/2017 | |
| JP | 2020094526 | A | | 6/2020 | |
| KR | 20190090679 | A | * | 8/2019 | B65D 90/30 |
| KR | 20200042278 | A | | 4/2020 | |
| KR | 102213227 | B1 | | 2/2021 | |
| KR | 20220051100 | A | | 4/2022 | |
| WO | 2016115603 | A1 | | 7/2016 | |
| WO | 2022266769 | A1 | | 12/2022 | |

OTHER PUBLICATIONS

Extended European Search Report for European Patent Application No. 23216341.0, mailed May 21, 2024, 5 pages.

Extended European Search Report for European Patent Application No. 23216339.4, mailed May 21, 2024, 7 pages.

Extended European Search Report for European Patent Application No. 23216338.6, mailed May 2, 2024, 6 pages.

Extended European Search Report for European Patent Application No. 23216343.6, mailed May 21, 2024, 7 pages.

* cited by examiner

GASEOUS FUEL SUPPLY SYSTEM FOR A CLEAN COMBUSTION ENGINE OF A VEHICLE

PRIORITY APPLICATIONS

The present application claims priority to European Patent Application No. 23216343.6, filed on Dec. 13, 2023, and entitled "GASEOUS FUEL SUPPLY SYSTEM FOR A CLEAN COMBUSTION ENGINE OF A VEHICLE," which is incorporated herein by reference in its entirety.

TECHNICAL FIELD

The disclosure relates generally to gaseous fuel supply systems to a combustion engine. In particular aspects, the disclosure relates to gaseous fuel supply system for a clean combustion engine of a vehicle. The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

For many years, the demands on internal combustion engines have been steadily increasing and engines are continuously developed to meet the various demands from the market. Reduction of exhaust gases, increasing engine efficiency, i.e. reduced fuel consumption, and lower noise level from the engines are some of the criteria that are important aspects when choosing vehicle engine. Furthermore, in the field of trucks, there are applicable law directives that have e.g. determined the maximum amount of exhaust gas pollution allowable. Still further, a reduction of the overall cost of the vehicle is important and since the engine constitutes a relatively large portion of the total costs, it is natural that also the costs of engine components are reduced.

In order to meet the demands, various engine concepts have been developed throughout the years where conventional combustion cylinders have been combined with e.g. a pre-compression stage and/or an expansion stage. Other engine concepts relates to the fuel used and combusted in the combustion engine. For example, gasoline and diesel can be exchanged to more environmentally friendly fuels, e.g. biofuels such as e.g. ethanol. In some cases, when exchanging the fuel, the combustion engine needs to be adapted to optimally operate on the new fuel. Lately, clean combustion engines, such as e.g. near zero emission combustion engines have become increasingly interesting. For example, by changing the fuel to hydrogen, or a hydrogen based fuel, the combustion of hydrogen with oxygen produces only water as biproduct (theoretically).

Clean combustion engines typically require an efficient and reliable fuel supply, and a pressure and temperature regulation of the supplied gaseous fuel. However, the systems today may not provide optimal temperature regulation of the supplied gaseous fuel, leading to inefficiencies in fuel consumption and potential damage to the engine components. There is thus a need in the industry for an improved system.

SUMMARY

According to a first aspect of the disclosure, gaseous fuel supply system for a clean combustion engine of a vehicle having a vehicle cooling system is provided. The supply system comprises: a gaseous fuel tank storing pressurized gaseous fuel; at least a first supply line arranged to supply pressurized gaseous fuel from the gaseous fuel tank to the clean combustion engine; at least a first heat exchanging component arranged in the first supply line; wherein the first heat exchanging component is arranged to transfer heat between a cooling fluid of the vehicle cooling system and the pressurized gaseous fuel in the first supply line. The first aspect of the disclosure may seek to solve problems with energy inefficient gaseous fuel supply systems. A technical benefit may include an improved energy efficiency for heating and/or cooling the pressurized gaseous fuel as it is transported from the gaseous fuel tank to the clean combustion engine. By using the vehicle cooling system for heat exchange with the pressurized gaseous fuel in the first supply line using the first heat exchanging component, the pressurized gaseous fuel can be heat exchanged in an efficient manner. For example, electrical heaters and/or additional cooling equipment such as fans or cooling plates may be omitted. By using the first heat exchanging component for enabling heat exchange between the pressurized gaseous fuel in the first supply line and the cooling fluid in the vehicle cooling system, the temperature of the pressurized gaseous fuel may be adapted in an improved manner. For example, the first heat exchanging component may be used to both actively heat and actively cool the pressurized gaseous fuel in the first supply line. Thus, the same component, i.e. the first heat exchanging component, may be used for both heating and cooling purposes. Moreover, by arranging the first heat exchanging component in the first supply line, the pressurized gaseous fuel may be heat exchanged by the vehicle cooling system as it is transported to the clean combustion engine from the gaseous fuel tank. Thus, the temperature of the pressurized gaseous fuel downstream of the gaseous fuel tank (i.e. after the pressurized gaseous fuel has been discharged from the gaseous fuel tank, and possibly been subject to an associated change in temperature) can be controlled. By using the vehicle cooling system for the heat exchange in the first heat exchanging component, the temperature of the pressurized gaseous fuel out of the first heat exchanging component can be advantageously controlled by the vehicle cooling fluid, e.g. controlled in response to the heat transfer need of the pressurized gaseous fuel. Hereby, an improved heat transfer and energy efficient fuel supply to the clean combustion engine may be provided.

Optionally in some examples, including in at least one preferred example, the first heat exchanging component comprises a heat transfer surface being arranged to transfer heat from the cooling fluid of the vehicle cooling system to the pressurized gaseous fuel in the first supply line. A technical benefit may include improved heat transfer between the cooling fluid and the pressurized gaseous fuel. The heat transfer surface may e.g. fluidly separate the cooling fluid and the pressurized gaseous fuel. The heat transfer surface may e.g. comprise fins or ribs for improving the heat transfer. In some examples, the first heat exchanging component comprises first and second heat transfer surfaces, the first heat transfer surface being arranged to receive heat from the cooling fluid of the vehicle cooling system, the second heat transfer surface being arranged to heat the pressurized gaseous fuel in the first supply line, and the second heat transfer surface being thermally conductively connected to the first heat transfer surface. For example, the first heat exchanging component may be a tube or pipe through which the cooling fluid or the pressurized gaseous fuel is transported during use, and the heat transfer surface a tube wall. For example, in the example in which a tube, during use, transports the pressurized gaseous fuel, the first heat transfer surface is the inner surface of the tube wall, and the second heat transfer surface is the outer surface of the tube wall.

Optionally in some examples, including in at least one preferred example, the first heat exchanging component is arranged as a cold temperature heat reservoir for the vehicle cooling system. A technical benefit may include energy efficient heating of the pressurized gaseous fuel in the first supply line. Thus, as the first heat exchanging component is arranged as a cold temperature heat reservoir for the vehicle cooling system, the vehicle cooling fluid will, during use, be cooled by the first heat exchanging component. Correspondingly, the pressurized gaseous fuel will, during use, be heated by the first heat exchanging component.

Optionally in some examples, including in at least one preferred example, further comprising a control unit configured to determine the temperature of the cooling fluid of vehicle cooling system fed to the first heat exchanging component, and to control the flow of the cooling fluid fed to the first heat exchanging component in response to that the determined temperature of the cooling fluid is above a predetermined temperature threshold. A technical benefit may include efficient control of the heat transfer to the pressurized gaseous fuel in the first supply line. The control unit may be configured to control the flow of the cooling fluid fed to the first heat exchanging component by operating a controllable valve, the controllable valve being configured to control the flow of the cooling fluid in the vehicle cooling system. Thus, as the determined temperature is above a predetermined temperature threshold, it is deemed that the cooling fluid can be advantageously used to heat the pressurized gaseous fuel in the first supply line. Thus, the predetermined temperature threshold is chosen accordingly, e.g. as being at least above the temperature of the pressurized gaseous fuel upstream of the first heat exchanging component. The control unit may be configured to control the flow of the cooling fluid fed to the first heat exchanging component in response to the determined temperature, e.g. by reducing the flow by a predetermined amount in response to that the temperature of the cooling fluid is above a predetermined high temperature threshold, and increasing the flow by a predetermined amount in response to that the temperature of the cooling fluid is below a predetermined low temperature threshold (but still higher than the previously mentioned predetermined temperature threshold). Thus, the flowrate of the cooling fluid may be controlled based on the determined temperature of the cooling fluid, e.g. at a certain location (e.g. just upstream of the first heat exchanging component). The flow of the cooling fluid fed to the first heat exchanging component may alternatively or additionally be controlled by a bypass, and a bypass valve, over the first heat exchanging component. For example, the control unit may be configured to open the bypass valve and to thereby guide at least a portion of the cooling fluid to bypass the first heat exchanging component in response to that the determined temperature of the cooling fluid is below the predetermined temperature threshold.

Optionally in some examples, including in at least one preferred example, the control unit is configured to determine the temperature of the pressurized gaseous fuel in the first supply line fed to the first heat exchanging component, and to control the flow of the cooling fluid fed to the first heat exchanging component in response to that the determined temperature of the pressurized gaseous fuel is below a predetermined temperature threshold (e.g. a first predetermined gas temperature threshold). A technical benefit may include efficient control of the heat transfer to the pressurized gaseous fuel in the first supply line. Moreover, the control unit may be configured to control the flow of the cooling fluid fed to the first heat exchanging component in response to temperature of both the cooling fluid and the pressurized gaseous fuel, e.g. in response to that the determined temperature of the cooling fluid is above a first predetermined temperature threshold, and that the determined temperature of the pressurized gaseous fuel is below a second predetermined temperature threshold.

Optionally in some examples, including in at least one preferred example, the predetermined temperature threshold is set such that, in use, the cooling fluid of the vehicle cooling system transfers heat to the pressurized gaseous fuel in the first supply line via the first heat exchanging component. A technical benefit may include efficient control of the heat transfer to the pressurized gaseous fuel in the first supply line. The predetermined temperature threshold may e.g. be set as being at least above the temperature of the pressurized gaseous fuel upstream of the first heat exchanging component, such as at least above the temperature of the pressurized gaseous fuel upstream of the first heat exchanging component by a predefined value.

Optionally in some examples, including in at least one preferred example, the first heat exchanging component is arranged as a heat temperature heat reservoir for the vehicle cooling system. A technical benefit may include energy efficient cooling of the pressurized gaseous fuel in the first supply line. Thus, as the first heat exchanging component is arranged as a heat temperature heat reservoir for the vehicle cooling system, the vehicle cooling fluid will, during use, be heated by the first heat exchanging component. Correspondingly, the pressurized gaseous fuel will, during use, be cooled by the first heat exchanging component. This may e.g. be applicable just after a refueling process of the gaseous fuel tank.

Optionally in some examples, including in at least one preferred example, the control unit is configured to determine the heat transfer need of the pressurized gaseous fuel in the first supply line, and to control the flow of the cooling fluid fed to the first heat exchanging component in response to the heat transfer need. A technical benefit may include energy efficient heat and cooling of the pressurized gaseous fuel in the first supply line, depending on the heat transfer need. The heat transfer need may e.g. be determined in response to a desired change in temperature of the pressurized gaseous fuel over the first heat exchanging component. Thus, the flow of the cooling fluid fed to the first heat exchanging component can be controlled in response to the heat transfer need of the pressurized gaseous fuel, or desired temperature change of the pressurized gaseous fuel over the first heat exchanging component.

Optionally in some examples, including in at least one preferred example, the gaseous fuel supply system further comprises: a compressor arranged in the first supply line between the first heat exchanging component and the clean combustion engine; and a second heat exchanging component arranged between the compressor and the clean combustion engine, wherein the second heat exchanging component is arranged to transfer heat between the pressurized gaseous fuel in the first supply line and the cooling fluid of the vehicle cooling system. A technical benefit may include an improved energy efficiency for heating and/or cooling the pressurized gaseous fuel as it is transported from the gaseous fuel tank to the clean combustion engine. The compressor may be used to further pressurize the gaseous fuel prior to reaching the clean combustion engine. Hereby, more gaseous fuel in the gaseous fuel tank may be utilized. However, due to the additional pressurization of the pressurized gaseous fuel by the compressor, the temperature of the pressurized gaseous fuel may change, with an additional need to heat exchange the pressurized gaseous fuel prior to the clean combustion engine. By using the second heat exchanging component for enabling heat exchange between the pressurized gaseous fuel in the first supply line and the cooling fluid in the vehicle cooling system, the temperature of the pressurized gaseous fuel may be adapted in an improved manner. The second heat exchanging component may be controlled in a corresponding manner as the first heat exchanging component. Thus, the second heat exchanging component may be used as a cold temperature heat reservoir or a hot temperature heat reservoir for the vehicle cooling system, exemplified further below.

That is, the second heat exchanging component may be used to both actively heat and actively cool the pressurized gaseous fuel in the first supply line downstream of the compressor. Thus, the same component, i.e. the second heat exchanging component, may be used for both heating and cooling purposes. Moreover, by arranging the second heat exchanging component in the first supply line downstream of the compressor, the pressurized gaseous fuel may be heat exchanged by the vehicle cooling system as it is transported to the clean combustion engine from the compressor. Thus, the temperature of the pressurized gaseous fuel downstream of the compressor (i.e. after the pressurized gaseous fuel has been discharged from the compressor, and possibly been subject to an associated change in temperature) can be controlled. By using the vehicle cooling system for the heat exchange in both the first and second heat exchanging components, the temperature of the pressurized gaseous fuel fed to the clean combustion engine can be advantageously controlled by the vehicle cooling fluid, and the vehicle cooling fluid can be advantageously used, e.g. by being used both as a cool temperature heat reservoir and hot temperature heat reservoir. Hereby, an improved heat transfer and energy efficient fuel supply to the clean combustion engine may be provided.

Optionally in some examples, including in at least one preferred example, the second heat exchanging component comprises a heat transfer surface arranged to transfer heat from the cooling fluid of the vehicle cooling system to the pressurized gaseous fuel in the first supply line, or to transfer heat to the cooling fluid of the vehicle cooling system from the pressurized gaseous fuel in the first supply line. A technical benefit may include improved heat transfer between the cooling fluid and the pressurized gaseous fuel. The heat transfer surface may e.g. fluidly separate the cooling fluid and the pressurized gaseous fuel. The heat transfer surface may e.g. comprise fins or ribs for improving the heat transfer. In some examples, the second heat exchanging component comprises first and second heat transfer surfaces, the first heat transfer surface being arranged to receive heat from, or being arranged to heat, the cooling fluid of the vehicle cooling system, the second heat transfer surface being arranged to heat, or receive heat from, the pressurized gaseous fuel in the first supply line, and the second heat transfer surface being thermally conductively connected to the first heat transfer surface. For example, the second heat exchanging component may be a tube or pipe through which the cooling fluid or the pressurized gaseous fuel is transported during use, and the heat transfer surface a tube wall. For example, in the example in which a tube, during use, transports the pressurized gaseous fuel, the second heat transfer surface is the inner surface of the tube wall, and the second heat transfer surface is the outer surface of the tube wall.

For example, the first heat exchanging component is used as a cold temperature heat reservoir for the vehicle cooling system, and the second heat exchanging component is used as a hot temperature heat reservoir for the vehicle cooling system, at least for predefined operation of the clean combustion engine.

Correspondingly to the first heat exchanging component, the control unit may be configured to determine the temperature of the cooling fluid of vehicle cooling system prior to fed to the second heat exchanging component, and to control the flow of the cooling fluid fed to the first second exchanging component in response to that the determined temperature of the cooling fluid is above or below a predetermined temperature threshold. A technical benefit may include efficient control of the heat transfer to the pressurized gaseous fuel in the first supply line. The predetermined temperature threshold associated with the first heat exchanging component may be referred to as a first predetermined temperature threshold, and the predetermined temperature threshold associated with the second heat exchanging component may be referred to as a second predetermined temperature threshold. The control unit may be configured to control the flow of the cooling fluid fed to the second heat exchanging component by operating the previously mentioned controllable valve configured to control the flow of the cooling fluid in the vehicle cooling system. Thus, in response to that the determined temperature fed to the second heat exchanging component is above the second predetermined temperature threshold, it is deemed that the cooling fluid can be advantageously used to heat the pressurized gaseous fuel in the first supply line by the second heat exchanging component, and in response to that the determined temperature fed to the second heat exchanging component is below the second predetermined temperature threshold, or below the second predetermined temperature by at least a predefined value, it is deemed that the cooling fluid can be advantageously used to cool the pressurized gaseous fuel in the first supply line by the second heat exchanging component. Thus, the second predetermined temperature threshold is chosen accordingly, e.g. as being at least above the temperature of the pressurized gaseous fuel upstream of the second heat exchanging component. The flow of the cooling fluid fed to the second heat exchanging component may be controlled by a bypass, and a bypass valve, over the second heat exchanging component. For example, the control unit may be configured to open the bypass valve and to thereby guide at least a portion of the cooling fluid to bypass the second heat exchanging component. Correspondingly to the first heat exchanging component, the control unit may be configured to additionally or alternatively determine the temperature of the pressurized gaseous fuel in the first supply line fed to second heat exchanging component, and to control the flow of the cooling fluid fed to the second heat exchanging component further in response to that the determined temperature of the pressurized gaseous fuel is above or below a predetermined temperature threshold (e.g. a second predetermined gas temperature threshold).

Optionally in some examples, including in at least one preferred example, the control unit is configured to determine the heat transfer need of the pressurized gaseous fuel in the first supply line, and to control the flow of the cooling fluid fed to the first heat exchanging component and to the second heat exchanging component in response to the heat transfer need. A technical benefit may include energy efficient heat and cooling of the pressurized gaseous fuel in the first supply line, depending on the heat transfer need.

Optionally in some examples, including in at least one preferred example, the first and second heat exchanging components are heat exchanging tubes, or heat exchanging channels. A technical benefit may include a suitable structure for heat exchange between the pressurized gaseous fuel and the cooling fluid. The first and second heat exchanging components may form a part of a tube heat exchanger, or of a plate heat exchanger. The heat exchanging tubes or channels can be made from materials with high thermal conductivity, such as metals or metal alloys, to facilitate efficient heat transfer between the cooling fluid and the pressurized gaseous fuel.

Optionally in some examples, including in at least one preferred example, the first and second heat exchanging components form part of a common heat exchanger. A technical benefit may include an efficient arrangement of the first and second heat exchanging components. For example, arranging the first and second heat exchanging components as a part of a common heat exchanger may be space efficient, helping to reduce the overall size and complexity of the gaseous fuel supply system, as well as to improve heat transfer efficiency. Moreover, by arranging the first and second heat exchanging components as a part of a common heat exchanger, the control of the cooling fluid to the first and second heat exchanging components may be achieved in an improved manner. Stated differently, the first and second heat exchanging components may be integrated into a common heat exchanger, i.e. one heat exchanging unit comprising the first and second heat exchanging components. The common heat exchanger may e.g. be a tube heat exchanger or a plate heat exchanger. For a tube heat exchanger, e.g. a tube-and-shell heat exchanger, the pressurized gaseous fuel is preferably arranged to be guided through the tubes, and the cooling fluid is arranged to flow on the shell side of the heat exchanger.

Optionally in some examples, including in at least one preferred example, the gaseous fuel system further comprises: a second supply line arranged to supply pressurized gaseous fuel from the gaseous fuel tank to the clean combustion engine, the second supply line bypassing at least the compressor in the first supply line. A technical benefit may include a more versatile system for supplying pressurized gaseous fuel to the clean combustion engine. That is, an alternative pathway for the pressurized gaseous fuel to reach the clean combustion engine is provided, allowing for more flexibility in system operation and control. In other words, an additional supply line to the first supply line is provided to the clean combustion engine. The first and second supply lines may at least partly overlap. The first supply line may be defined to extend from the outlet of the gaseous fuel tank to the clean combustion engine (e.g. via a fuel rail gaseous fuel supply system and/or to an engine injection pressure regulator upstream or on of the fuel rail) via the first heat exchanging component, and possibly via the compressor and second heat exchanging component. The second supply line may be defined to extend from the outlet of the gaseous fuel tank to the clean combustion engine (e.g. via a fuel rail gaseous fuel supply system and/or to an engine injection pressure regulator upstream of the fuel rail) bypassing the first heat exchanging component, and possibly bypassing the compressor and the second heat exchanging component. For example, the gaseous fuel supply system may comprise at least a first piping arranged between the gaseous fuel tank and the clean combustion engine via the first heat exchanging component, and possibly via the compressor and the second heat exchanging component, and a second piping arranged between the first piping upstream of the first heat exchanging component and the clean combustion engine bypassing the first heat exchanging component, and possibly bypassing the compressor and the second heat exchanging component. The first supply line may be comprised in the first piping but not the second piping, while the second supply line may be at least partly comprised in the first piping (i.e. upstream of the first exchanging component) and in the second piping.

Optionally in some examples, including in at least one preferred example, the gaseous fuel system further comprises: a third heat exchanging component arranged in the second supply line, wherein the third heat exchanging component is arranged to transfer heat between the pressurized gaseous fuel in the second supply line and the cooling fluid of the vehicle cooling system. A technical benefit may include an improved energy efficiency for heating and/or cooling the pressurized gaseous fuel as it is transported from the gaseous fuel tank to the clean combustion engine via the second supply line. The third heat exchanging component may be controlled in a corresponding manner as the first and/or second heat exchanging component. Thus, the third heat exchanging component may be used as a cold temperature heat reservoir or a hot temperature heat reservoir for the vehicle cooling system. Moreover, the third heat exchanging component may be a heat exchanging tube, or a heat exchanging channel, and may form a part of the common heat exchanger together with the first and second heat exchanging components.

Optionally in some examples, including in at least one preferred example, the vehicle cooling system is configured to cool the clean combustion engine and/or a transmission of the vehicle. A technical benefit may include advantageous utilization of the cooling system for the clean combustion engine or the transmission of the vehicle. The vehicle cooling system may include components such as radiators, coolant pump, and coolant lines to circulate the cooling fluid throughout the clean combustion engine and/or a transmission.

Optionally in some examples, including in at least one preferred example, the vehicle cooling system is an external cooling system to the cooling system of the clean combustion engine and of the transmission of the vehicle. The cooling system may e.g. be a cooling system to a hydraulic system of the vehicle. In some examples, at least one of the first, second and third heat exchanging components are coupled to the vehicle cooling system of the clean combustion engine and/or a transmission of the vehicle, and at least one of the first, second and third heat exchanging components are coupled to the vehicle cooling system of a hydraulic system of the vehicle. As an alternative, the second or third heat exchanging component may be an electrical heater.

Optionally in some examples, including in at least one preferred example, the common heat exchanger is configured to receive coolant fluid of the vehicle cooling system, to guide the cooling fluid from the first heat exchanging component to the second heat exchanging component, or from the second heat exchanging component to the first heat exchanging component, and to discharge coolant fluid to the clean combustion engine or transmission of the vehicle. A technical benefit may include improved energy efficiency for heating and cooling the pressurized gaseous fuel as it is transported from the gaseous fuel tank to the clean combustion engine via the first and second heat exchanging components. For example, the cooing fluid of the vehicle cooling system is first cooled in the first heat exchanging component, and thereafter heated in the second heat exchanging component, prior to be discharged to the clean combustion engine or transmission of the vehicle.

Optionally in some examples, including in at least one preferred example, the gaseous fuel supply system further comprises at least one controllable valve arranged in at least the first supply line, wherein the controllable valve is configured to control the flow of pressurized gaseous fuel in the first supply line. A technical benefit may include improved control of the pressurized gaseous fuel in the first supply line. A corresponding controllable valve may be arranged in the second supply line. The first supply line and/or the second supply line of the gaseous fuel supply system may be comprised in a gaseous fuel supply piping as previously described.

Optionally in some examples, including in at least one preferred example, the gaseous fuel supply system further comprising a gaseous fuel buffer tank arranged downstream of the compressor, wherein the buffer tank is configured to supply pressurized gaseous fuel to the clean combustion engine via the first supply line. A technical benefit may include improved control of the pressurized gaseous fuel to the clean combustion engine. The second heat exchanging component may be arranged upstream or downstream of the gaseous fuel buffer.

Optionally in some examples, including in at least one preferred example, the pressurized gaseous fuel is pressurized hydrogen. A technical benefit may include utilization of a fuel having a high energy density (approximately 120 MJ/kg). Moreover, by using hydrogen as the fuel for combustion in the clean combustion engine, CO2, unburned hydrocarbons (CO) and other carbon-containing emissions can be kept low, or even be avoided.

Optionally in some examples, including in at least one preferred example, the gaseous fuel tank may be arranged to store the pressurized gaseous fuel at 700 bar or 800 bar. For example, the gaseous fuel tank is arranged to keep the pressurized gaseous fuel at a maximum pressure of between 700 bar and 800 bar. For example, the gaseous fuel tank is arranged to store the pressurized gaseous fuel between 70 bar and 700 bar or 800 bar.

Optionally in some examples, including in at least one preferred example, the fuel stored in the gaseous fuel tank is mainly gaseous. For example, at least 70%, or at least 80%, or at least 90%, or at least 95% (based on volume) of the fuel in the gaseous fuel tank is gaseous. Thus, the gaseous fuel tank is arranged to store the fuel as pressurized gaseous fuel such that at least 70%, or at least 80%, or at least 90%, or at least 95% (based on volume) of the fuel in the gaseous fuel tank is gaseous.

Optionally in some examples, including in at least one preferred example, the clean combustion engine is a hydrogen combustion engine, such as a hydrogen high pressure direct injection engine, wherein the gaseous fuel supply system is arranged to supply pressurized gaseous fuel to such hydrogen combustion engine.

The clean combustion engine is configured to receive gaseous fuel at a changeable demanded injection pressure being above a predetermined minimum required injection pressure and below a predetermined maximum required injection pressure. The control unit may e.g. be configured to control the pressure of the gaseous fuel supplied to a fuel rail, e.g. by means of an engine injection pressure regulator arranged upstream of or on the fuel rail.

Optionally in some examples, including in at least one preferred example, the minimum required injection pressure of the clean combustion engine is at least 80 bar.

According to a second aspect of the disclosure, a vehicle comprising the gaseous fuel supply system of the first aspect of the disclosure is provided. The second aspect of the disclosure may seek to solve the same problem as described for the first aspect of the disclosure. Thus, effects and features of the second aspect of the disclosure are largely analogous to those described above in connection with the first aspect of the disclosure.

Optionally in some examples, including in at least one preferred example, the vehicle further comprises the clean combustion engine being a hydrogen combustion engine or a hydrogen high pressure direct injection engine. For example, the minimum required injection pressure of the hydrogen high pressure direct injection engine is at least 80 bar.

Optionally in some examples, including in at least one preferred example, the vehicle further comprises the vehicle cooling system. As described in the first aspect of the disclosure, the vehicle cooling system may be configured to cool the clean combustion engine and/or the transmission of the vehicle.

According to third aspect of the disclosure, an engine system is provided. The engine system comprises the gaseous fuel supply system of the first aspect of the disclosure, and a clean combustion engine. The clean combustion engine may typically correspond to that already described with reference to the first aspect of the disclosure or the second aspect of the disclosure. The third aspect of the disclosure may seek to solve the same problem as described for the first and second aspects of the disclosure. Thus, effects and features of the third aspect of the disclosure are largely analogous to those described above in connection with the first and second aspects of the disclosure.

According to a fourth aspect of the disclosure, a method for transferring heat between a gaseous fuel supply system for a clean combustion engine of a vehicle, and a vehicle cooling system, is provided. The method comprises: heating, by a first heat exchanging component, pressurized gaseous fuel in a first supply line transferring gaseous fuel from a gaseous fuel tank to the clean combustion engine, by the vehicle cooling system. The fourth aspect of the disclosure may seek to solve the same problem as described for the first to third aspects of the disclosure. Thus, effects and features of the fourth aspect of the disclosure are largely analogous to those described above in connection with the first to third aspects of the disclosure. Thus, the first heat exchanging component is preferably that described with reference to the first aspect of the disclosure. That is, the method may comprise heating pressurized gaseous fuel in the gaseous fuel supply system of the first aspect of the disclosure by the vehicle cooling system. The method may further comprise: heating or cooling, by a second exchanging component, pressurized gaseous fuel in the first supply line, by the vehicle cooling system and/or heating, by a third heat exchanging component, pressurized gaseous fuel in a second supply line transferring gaseous fuel from a gaseous fuel tank to the clean combustion engine, by the vehicle cooling system. The second and third heat exchanging components are preferably those described with reference to the first aspect of the disclosure.

Applicable to the first to fourth aspects of the disclosure, the clean combustion engine may be configured to combust the gaseous fuel, e.g. hydrogen or a hydrogen-based fuel, producing water as by-product in the exhausts, wherein the gaseous fuel supply system is arranged to supply such gaseous fuel to the clean combustion engine. The clean combustion engine is typically configured to compress the gaseous fuel, e.g. hydrogen or a hydrogen-based fuel, together with air whereafter the fuel-air mixture is ignited (by a spark-plug or injection of another fuel, e.g. diesel). Alternatively, the clean combustion engine may be configured to compress only air, wherein the gaseous fuel is injected at the end of the compression stroke of the engine to either auto-ignite (by compression ignition) or be ignited by a spark-plug or injection of another fuel (e.g. diesel). The clean combustion engine may thus be an internal combustion engine.

It should be understood that the gaseous fuel of the gaseous fuel supply system may be hydrogen or a hydrogen-based fuel. As an alternative, the gaseous fuel of the gaseous fuel supply system is at least one of the following: natural gas, biogas, syngas, methane, propane and butane.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

DETAILED DESCRIPTION

The detailed description set forth below provides information and examples of the disclosed technology with sufficient detail to enable those skilled in the art to practice the disclosure.

The disclosed technology may solve the problem relating to energy inefficient gaseous fuel supply systems. The disclosed technology uses the vehicle cooling system for heat exchange with the pressurized gaseous fuel in the gaseous fuel supply system and using heat exchanging components. A technical benefit may include an improved energy efficiency for heating and/or cooling the pressurized gaseous fuel as it is transported from the gaseous fuel tank to the clean combustion engine. For example, electrical heaters and/or additional cooling equipment such as fans or cooling plates may be omitted. By using a heat exchanging component fluidly connected to the vehicle cooling system for enabling heat exchange between the pressurized gaseous fuel in a supply line and the cooling fluid in the vehicle cooling system, the temperature of the pressurized gaseous fuel may be adapted in an improved manner, and supplied to the clean combustion engine at a desired temperature. Thus, the temperature of the pressurized gaseous fuel downstream of the gaseous fuel tank (i.e. after the pressurized gaseous fuel has been discharged from the gaseous fuel tank, and possibly been subject to an associated change in temperature) can be controlled. By using the vehicle cooling system for the heat exchange, the temperature of the pressurized gaseous fuel can be advantageously controlled by the vehicle cooling fluid, e.g. controlled in response to the heat transfer need of the pressurized gaseous fuel. Hereby, an improved heat transfer and energy efficient fuel supply to the clean combustion engine may be provided.

Figure 1:
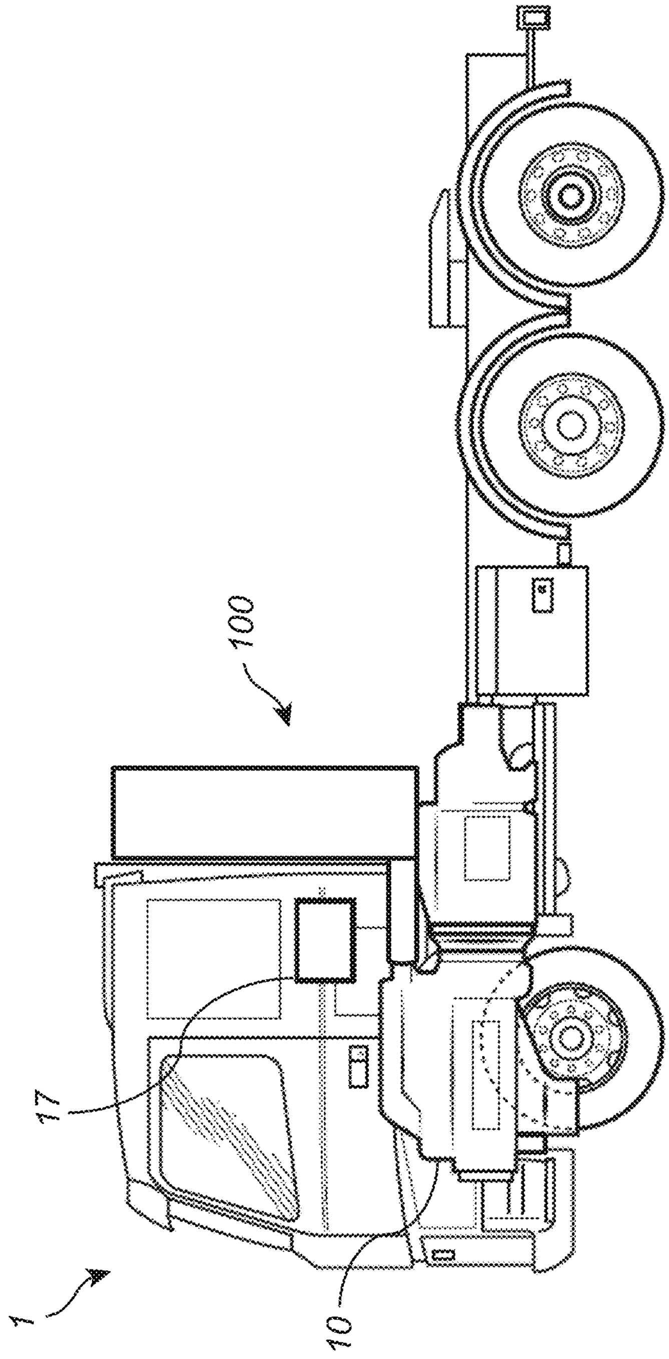
FIG. 1 is an exemplary, partly schematic, side view of vehicle comprising an internal combustion engine and a gaseous fuel supply system arranged to supply gaseous fuel to the internal combustion engine according to one example.

FIG. 1 shows a vehicle 1 in the form of an exemplary heavy duty truck. The vehicle 1 illustrated in FIG. 1 comprises an internal combustion engine 10 for propelling the vehicle 1, wherein the internal combustion engine 10 is a clean combustion engine. The clean combustion engine 10 is configured to combust a pressurized gaseous fuel producing water as by-product in the exhausts. The clean combustion engine 10 may e.g. be a hydrogen combustion engine, such as a hydrogen high pressure direct injection engine. However, the vehicle may be a hybrid, comprising at least one electric machine or electric traction machine powered by an energy storage system (not shown) to provide additional propulsion power to the vehicle 1. The clean combustion engine 10 is powered by a gaseous fuel (e.g. hydrogen) supplied to the clean combustion engine 10 by a gaseous fuel supply system 100.

The vehicle 1 comprises a control unit 17 configured to control at least some of the operation of the gaseous fuel supply system 100, such as e.g. the control of the gaseous fuel from a gaseous fuel tank to the clean combustion engine 10.

Figure 2:
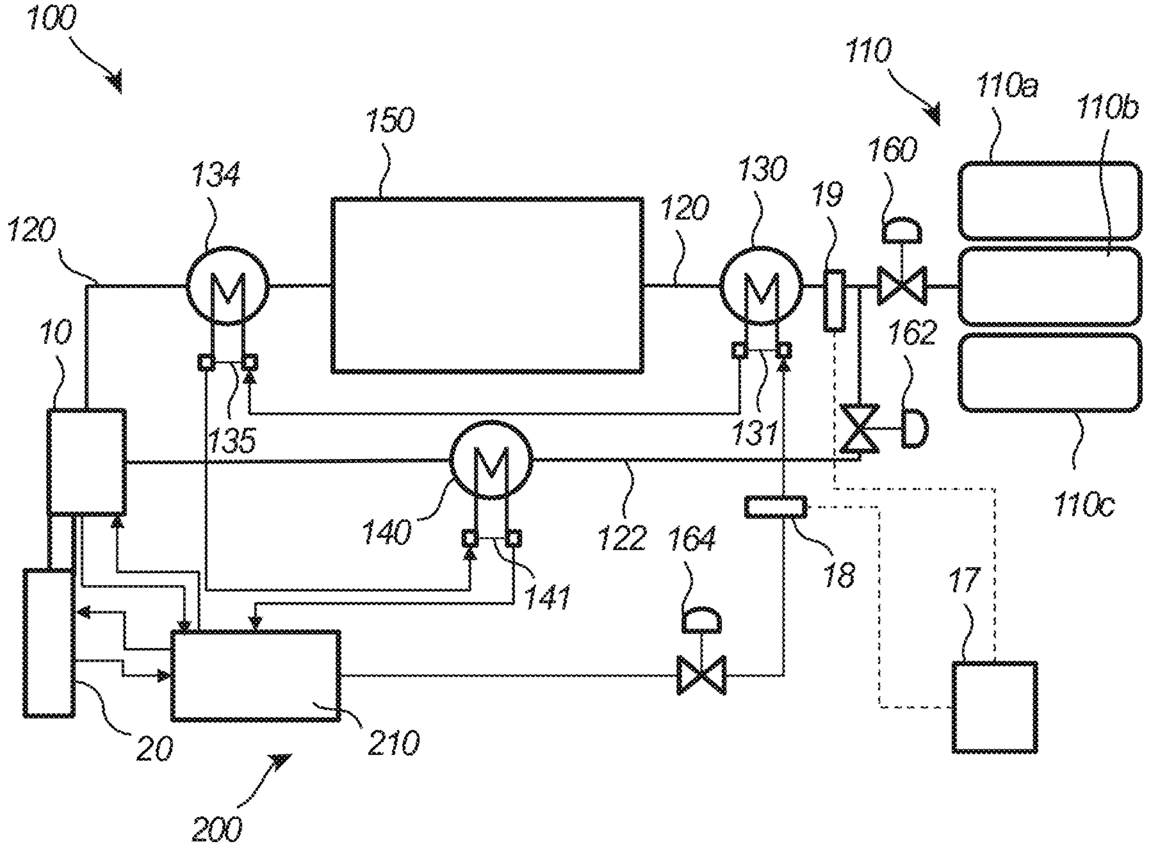
FIG. 2 is a schematic view of the gaseous fuel supply system of FIG. 1 and a vehicle cooling system according to one example.

In FIG. 2, the gaseous fuel supply system 100 of FIG. 1 is shown in more detail. The gaseous fuel supply system 100 comprises a gaseous fuel tank arrangement 110 storing pressurized gaseous fuel, e.g. pressurized hydrogen, and a first supply line 120 arranged to supply pressurized gaseous fuel from the gaseous fuel tank arrangement 110 to the clean combustion engine 10. In the example of FIG. 2, the gaseous fuel tank arrangement 110 comprises a first gaseous fuel tank 110*a*, a second gaseous fuel tank 110*b* and a third gaseous fuel tank 110 storing pressurized gaseous fuel. Any one or all of the first, second and third gaseous fuel tanks 110*a*, 110*b*, 110*c* may be fluidly coupled a first controllable valve 160 arranged in the first supply line 120 and configured to control the flow of pressurized gaseous fuel in the first supply line 120. As also shown in FIG. 2, a vehicle cooling system 200 including a cooling fluid 210 is arranged to cool the clean combustion engine 10 and/or the transmission 20 of the clean combustion engine 10. The vehicle cooling system 200 is configured to guide the cooling fluid 210 to the clean combustion engine 10 and/or the transmission 20 in order to cool the clean combustion engine 10 and/or the transmission 20. Thus, the clean combustion engine 10 and/or the transmission 20 is a hot temperature heat reservoir of the vehicle cooling system 200.

As shown in FIG. 2, the gaseous fuel supply system 100 comprises a first heat exchanging component 130 arranged in the first supply line 120 and being configured to transfer heat between the cooling fluid 210 of the vehicle cooling system 200 and the pressurized gaseous fuel in the first supply line 120. Thus, in addition to the heat transfer between the cooling fluid 210 of the vehicle cooling system 200 and the clean combustion engine 10 and/or the transmission 20, the first heat exchanging component 130 is arranged to provide additional heat transfer between the cooling fluid 210 of the vehicle cooling system 200 and the pressurized gaseous fuel in the first supply line.

The gaseous fuel supply system 100 may further comprise a compressor 150 arranged in the first supply line 120 between the first heat exchanging component 130 and the clean combustion engine 10. The compressor 150 is arranged to further pressurize the gaseous fuel prior to reaching the clean combustion engine 10. For example, as the gaseous fuel in the gaseous fuel tank arrangement 110 is discharged, the pressure of the gaseous fuel in the first, second and/or third gaseous fuel tanks 110*a*, 110*b*, 110*c* is reduced, e.g. to below the demanded injection pressure of the clean combustion engine 10. In order to utilize more of the gaseous fuel in the gaseous fuel tank arrangement 110, the compressor 150 may pressurize the gaseous fuel, e.g. to above the demanded injection pressure of the clean combustion engine 10. The gaseous fuel supply system 100 may further comprise a gaseous fuel buffer tank (not shown) arranged downstream of the compressor 150. The buffer tank may be configured to store, and supply, pressurized gaseous fuel to the clean combustion engine 10 via the first supply line 120.

The gaseous fuel supply system 100 may further comprise a second heat exchanging component 134 arranged between the compressor 150 and the clean combustion engine 10. That is, the first supply line 120 may comprise the first heat exchanging component 130 upstream of the compressor 150 and the second heat exchanging component 134 downstream of the compressor 150. The second heat exchanging component 134 is arranged to transfer heat between the pressurized gaseous fuel in the first supply line 120 and the cooling fluid 210 of the vehicle cooling system 200.

As shown in FIG. 2, the gaseous fuel supply system 100 may comprise a second supply line 122 arranged to supply pressurized gaseous fuel from the gaseous fuel tank arrangement 110 (i.e. any one or all of the first, second and third gaseous fuel tanks 110*a*, 110*b*, 110*c*) to the clean combustion engine 10. The second supply line 122 is arranged to bypass the first heat exchanging component 130, the compressor 150 and the second heat exchanging component 134. Thus, pressurized gaseous fuel supplied to the clean combustion engine 10 by the second supply line 122 will not be heat exchanged by the first and second heat exchanger components 130, 134. Instead, a third heat exchanging component 140 is arranged in the second supply line 122. The third heat exchanging component 140 is arranged to transfer heat between the pressurized gaseous fuel in the second supply line 122 and the cooling fluid 210 of the vehicle cooling system 200. The flow of pressurized gaseous fuel in the second supply line 122 may be controlled by at least a second controllable valve 162 arranged in the second supply line 122.

The control unit 17 may be configured to control the flow of the cooling fluid 210 in the vehicle cooling system, at least the flow of cooling fluid 210 though the first, second and third heat exchanging components 130, 134, 140. For example, the control unit 17 is configured to control the flow of the cooling fluid fed to the first, second and third heat exchanging components 130, 134, 140 by operating a third controllable valve 164. The third controllable valve 164 is configured to control the flow of the cooling fluid 210 in the vehicle cooling system 200. For example, the flow of the cooling fluid 210 fed to the first, second and third heat exchanging components 130, 134, 140 may be controlled by a corresponding bypass 131, 135, 141, and corresponding bypass valve (not shown). That is, the flow of cooling fluid 210 fed to the first heat exchanging component 130 may be controlled by controlling the flow of cooling fluid 210 in a first bypass 131 over the first heat exchanging component 130, the flow of cooling fluid 210 fed to the second heat exchanging component 134 may be controlled by controlling the flow of cooling fluid 210 in a second bypass 131 over the second heat exchanging component 134 and the flow of cooling fluid 210 fed to the third heat exchanging component 140 may be controlled by controlling the flow of cooling fluid 210 in a third bypass 141 over the third heat exchanging component 140. For example, the control unit 17 may be configured to open the corresponding bypass valve and to thereby guide at least a portion of the cooling fluid 210 to the corresponding first, second and third bypass 131, 135, 141 of the first, second and third heat exchanging components 130, 134, 140, respectively.

Thus, depending on the heat transfer demand of the pressurized gaseous fuel, the flow of the cooling fluid 210 in the vehicle cooling system 200 may be adapted accordingly. For example, any one of the first, second and third heat exchanging components 130, 134, 140 may be used to both actively heat and actively cool the pressurized gaseous fuel in the first and second supply lines 120, 122 by the cooling fluid 210.

For example, the first heat exchanging component 130 may be arranged as a cold temperature heat reservoir for the vehicle cooling system 200. That is, during use, the vehicle cooling fluid 210 is cooled and the pressurized gaseous fuel is be heated by the first heat exchanging component 130. Thus, the temperature of the pressurized gaseous fuel downstream of the gaseous fuel tank arrangement 110, i.e. after the pressurized gaseous fuel has been discharged from the first, second and/or third gaseous fuel tanks 110*a*, 110*b*, 110*c*, can be heated in response to the associated change in temperature associated with the discharge from the gaseous fuel tank arrangement 110. The gaseous fuel supply system 100 may comprise a first temperature sensor 18 arranged in the vehicle cooling system 200, and configured to determine the temperature of the cooling fluid 210 fed to the first heat exchanging component 130 (i.e. just upstream of the first heat exchanging component 130). Hereby, the control unit 17 may determine the temperature of the cooling fluid 210 by the first temperature sensor 18, and control the flow of the cooling fluid 210 fed to the first heat exchanging component 130 in response to that the determined temperature of the cooling fluid 210 is above a predetermined first temperature threshold. The control unit 17 may be configured to control the flow of the cooling fluid 210 fed to the first heat exchanging component 134 by operating the third controllable valve 164 and/or by controlling the flow of cooling fluid 210 in the first bypass 131 as previously described. Thus, in response to that the determined temperature is above the predetermined first temperature threshold, which e.g. is set to be at least higher than the temperature of the pressurized gaseous fuel fed to the first heat exchanging component 130, it is deemed that the cooling fluid 210 can be advantageously used to heat the pressurized gaseous fuel in the first supply line 120, and the third controllable valve 164, and/or the first bypass 131 is controlled accordingly. Thus, the predetermined first temperature threshold is set such that, in use, the cooling fluid 210 of the vehicle cooling system 200 transfers heat to the pressurized gaseous fuel in the first supply line 120 via the first heat exchanging component 130.

The gaseous fuel supply system 100 may comprise a second temperature sensor 19 arranged in the first supply line 120, and configured to determine the temperature of the pressurized gaseous fuel fed to the first heat exchanging component 130 (i.e. just upstream of the first heat exchanging component 130). Hereby, the control unit 17 may determine the temperature of the pressurized gaseous fuel by the second temperature sensor 19. The temperature of pressurized gaseous fuel fed to the clean combustion engine 10 is typically set, and thus the preferred temperature of the pressurized gaseous fuel out of the first heat exchanging component 130 may be correspondingly known. By comparing the determined temperature of the pressurized gaseous fuel by means of the second temperature sensor 19, and the preferred temperature of the pressurized gaseous fuel out of the first heat exchanging component 134, a heat transfer need of the pressurized gaseous fuel in the first supply line 130, or at least a heat transfer need of the pressurized gaseous fuel over the first heat exchanging component 134, can be determined by the control unit 17. Hereby, the control unit 17 may control the flow of the cooling fluid 210 fed to the first heat exchanging component 130 in response to the determined heat transfer need. That is, in addition to controlling the flow of the cooling fluid 210 in response to the determined temperature of the cooling fluid by means of the first temperature sensor 18, the control unit 17 may be configured to control the flow of cooling fluid 210 fed to the first heat exchanging component 130 in response to the determined heat transfer need of the pressurized gaseous fuel over the first heat exchanging component 130.

In a corresponding manner, the control unit 17 may be configured to control the flow of cooling fluid 210 fed to the second and third heat exchanging components 134, 140. That is, a third temperature sensor (not shown) may be arranged in the vehicle cooling system 200, and configured to determine the temperature of the cooling fluid 210 fed to the second heat exchanging component 134 (i.e. just upstream of the second heat exchanging component 134), and a fourth temperature sensor (not shown) may be arranged in the first supply line 120 and configured to determine the temperature of the pressurized gaseous fuel fed to the second heat exchanging component 134 (i.e. just upstream of the second heat exchanging component 134). Correspondingly, a fifth temperature sensor (not shown) may be arranged in the vehicle cooling system 200, and configured to determine the temperature of the cooling fluid 210 fed to the third heat exchanging component 140 (i.e. just upstream of the third heat exchanging component 140), and a sixth temperature sensor (not shown) may be arranged in the second supply line 122 and configured to determine the temperature of the pressurized gaseous fuel fed to the third heat exchanging component 140 (i.e. just upstream of the third heat exchanging component 140).

For example, by controlling the flow of cooling fluid 120 fed to the first and second heat exchanging components 130, 134, the first heat exchanging component 130 may be used as a cold temperature heat reservoir for the vehicle cooling system 200, and the second heat exchanging component 134 may be used as a hot temperature heat reservoir for the vehicle cooling system 200, at least for predefined operation of the clean combustion engine 10. Thus, the pressurized gaseous fuel may be heated in the first heat exchanging component 130, and thereafter cooled in the second heat exchanging component 140, downstream of the compressor 150.

Figure 3:
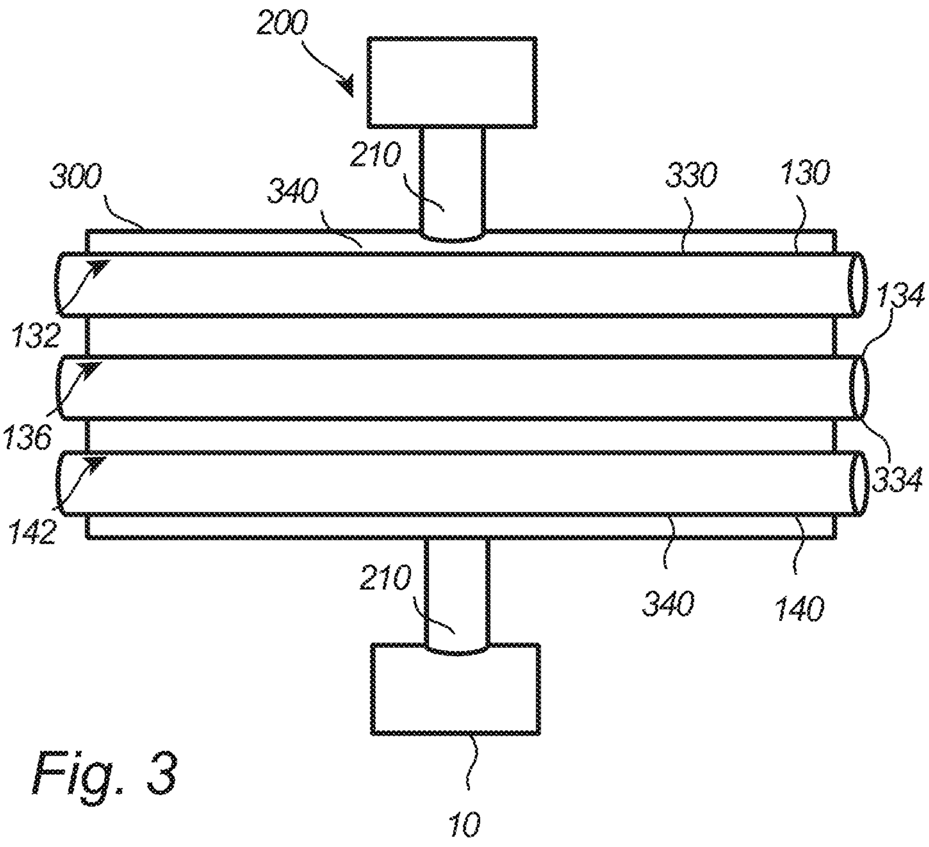
FIG. 3 is a common heat exchanger of the gaseous fuel supply system according to one example.

In FIG. 3, an example of a common heat exchanger 300 comprising the first, second and third heat exchanging components 130, 134, 140 is shown. The common heat exchanger 300 may thus be used in the gaseous fuel supply system 100 of FIG. 2, why the same reference numerals are used to describe the components in FIG. 3. The common heat exchanger 300 in FIG. 3 is a tube-and-shell heat exchanger comprising tubes 330, 334, 340 and a shell side 305. The common tube exchanger 300 is arranged to guide the pressurized gaseous fuel in the tubes 330, 334, 340, and to transfer heat with the cooling fluid 210 arranged to be guided on the shell side 305. The shell side 305 may comprise any one of, or all of, the first, second and third bypass 131, 135, 141 (not shown in FIG. 3).

The first heat exchanging component 130 is in FIG. 3 exemplified as a first heat exchanging tube 330 and comprising a heat transfer surface 132. Thus, during use, the pressurized gaseous fuel flowing through the first heat exchanging tube 330 will heat exchange with the cooling fluid 210 of the vehicle cooling system 200 flowing on the shell side 305. Correspondingly, the second heat exchanging component 134 is in FIG. 3 exemplified as a second heat exchanging tube 334 and comprising a heat transfer surface 136. Thus, during use, the pressurized gaseous fuel flowing through the second heat exchanging tube 334 will heat exchange with the cooling fluid 210 of the vehicle cooling system 200 flowing on the shell side 305. Moreover, the third heat exchanging component 140 is in FIG. 3 exemplified as a third heat exchanging tube 340 and comprising a heat transfer surface 142. Thus, during use, the pressurized gaseous fuel flowing through the third heat exchanging tube 340 will heat exchange with the cooling fluid 210 of the vehicle cooling system 200 flowing on the shell side 305. By controlling the flow of cooling fluid 210 on the shell side 305, e.g. by the corresponding first, second and third bypass 131, 135, 141, the heat exchange with the pressurized gaseous fuel in the first, second and third heat exchanging tubes 330, 334, 340 may be controlled. Even though the common heat exchanger 300 is exemplified as a tube-and-shell heat exchanger in FIG. 3, the common heat exchanger may take other forms, such as e.g. a plate heat exchanger in which the first, second and third heat exchanging components 130, 134, 140 are corresponding heat exchanging channels.

Turning back to FIG. 2, and implementing the common heat exchanger 300 of FIG. 3, the common heat exchanger 300 may be configured to receive coolant fluid 210 of the vehicle cooling system 200, to guide the cooling fluid from the first heat exchanging component 130 to the second heat exchanging component 134, and to subsequently guide the cooling fluid from the second heat exchanging component 134 to the third heat exchanging component 140, and to discharge coolant fluid to the clean combustion engine 10 or transmission 20 of the vehicle 1.

Figure 4:
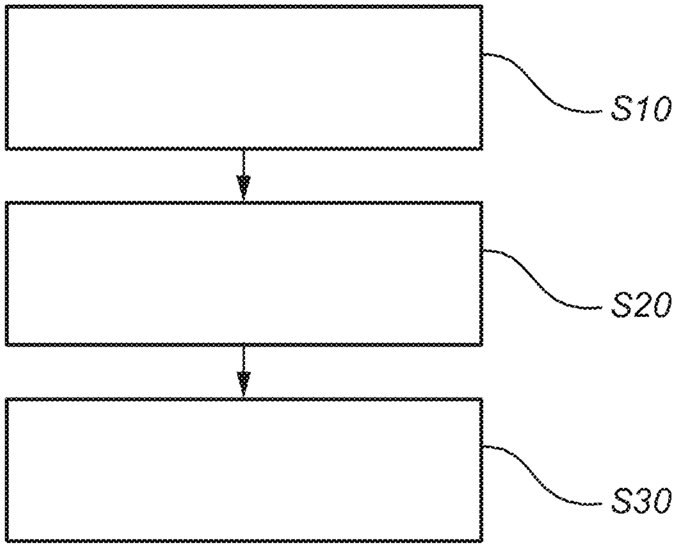
FIG. 4 is a flowchart is a flow chart of an exemplary method according to one example.

FIG. 4 is a flow chart of a method for transferring heat between a gaseous fuel supply system for a clean combustion engine of a vehicle, and a vehicle cooling system, such as e.g. between the gaseous fuel supply system 100 and the vehicle cooling system 200 of FIG. 2. Thus, reference is further made to features described in FIGS. 1-2 in the following.

In a first action or step, S10, pressurized gaseous fuel in a first supply line 120 transferring gaseous fuel from a gaseous fuel tank 110*a*, 110*b*, 110*c* to the clean combustion engine 10 is heated by a first heat exchanging component 130.

In a second action or step, S20, pressurized gaseous fuel in the first supply line 120 is heated by a second heat exchanging component 134.

In a third action or step, S30, which may be carried out in in parallel to the first and or second action or step S10, S20, pressurized gaseous fuel in a second supply line 122 transferring gaseous fuel from a gaseous fuel tank 110*a*, 110*b*, 110*c* to the clean combustion engine 10 is heated by a third heat exchanging component 140.

This first, second and third heat exchanging components 130, 134, 140 may be those described with reference to FIGS. 2-3.

Example 1. A gaseous fuel supply system for a clean combustion engine of a vehicle having a vehicle cooling system, the supply system comprising: a gaseous fuel tank storing pressurized gaseous fuel; at least a first supply line arranged to supply pressurized gaseous fuel from the gaseous fuel tank to the clean combustion engine; at least a first heat exchanging component arranged in the first supply line; wherein the first heat exchanging component is arranged to transfer heat between a cooling fluid of the vehicle cooling system and the pressurized gaseous fuel in the first supply line.

Example 2. The gaseous fuel supply system of example 1, wherein the first heat exchanging component comprises a heat transfer surface being arranged to transfer heat from the cooling fluid of the vehicle cooling system to the pressurized gaseous fuel in the first supply line.

Example 3. The gaseous fuel supply system of any of examples 1-2, wherein the first heat exchanging component is arranged as a cold temperature heat reservoir for the vehicle cooling system.

Example 4. The gaseous fuel supply system of any of examples 1-3, further comprising a control unit configured to determine the temperature of the cooling fluid of vehicle cooling system fed to the first heat exchanging component, and to control the flow of the cooling fluid fed to the first heat exchanging component in response to that the determined temperature of the cooling fluid is above a predetermined temperature threshold.

Example 5. The gaseous fuel supply system of example 4, wherein the predetermined temperature threshold is set such that, in use, the cooling fluid of the vehicle cooling system transfers heat to the pressurized gaseous fuel in the first supply line via the first heat exchanging component.

Example 6. The gaseous fuel supply system of any of examples 4-5, wherein the control unit is configured to determine the heat transfer need of the pressurized gaseous fuel in the first supply line, and to control the flow of the cooling fluid fed to the first heat exchanging component in response to the heat transfer need.

Example 7. The gaseous fuel supply system of any of examples 1-6, further comprising: a compressor arranged in the first supply line between the first heat exchanging component and the clean combustion engine; and a second heat exchanging component arranged between the compressor and the clean combustion engine, wherein the second heat exchanging component is arranged to transfer heat between the pressurized gaseous fuel in the first supply line and the cooling fluid of the vehicle cooling system.

Example 8. The gaseous fuel supply system of example 7, wherein the second heat exchanging component comprises a heat transfer surface arranged to transfer heat from the cooling fluid of the vehicle cooling system to the pressurized gaseous fuel in the first supply line, or to transfer heat to the cooling fluid of the vehicle cooling system from the pressurized gaseous fuel in the first supply line.

Example 9. The gaseous fuel supply system of any of examples 7-8, wherein the first and second heat exchanging components are heat exchanging tubes or heat exchanging channels.

Example 10. The gaseous fuel supply system of any of examples 7-8, wherein the first and second heat exchanging components form part of a common heat exchanger.

Example 11. The gaseous fuel supply system of any of examples 7-10, further comprising: a second supply line arranged to supply pressurized gaseous fuel from the gaseous fuel tank to the clean combustion engine, the second supply line bypassing at least the compressor in the first supply line.

Example 12. The gaseous fuel supply system of example 11, further comprising: a third heat exchanging component arranged in the second supply line, wherein the third heat exchanging component is arranged to transfer heat between the pressurized gaseous fuel in the second supply line and the cooling fluid of the vehicle cooling system.

Example 13. The gaseous fuel supply system of any of examples 1-12, wherein the vehicle cooling system is configured to cool the clean combustion engine and/or a transmission of the vehicle Example 14. The gaseous fuel supply system of any of examples 7-12 and example 13, wherein the common heat exchanger is configured to receive coolant fluid of the vehicle cooling system, to guide the cooling fluid from the first heat exchanging component to the second heat exchanging component, or from the second heat exchanging component to the first heat exchanging component, and to discharge coolant fluid to the clean combustion engine or transmission of the vehicle.

Example 15. The gaseous fuel supply system of any of examples 1-14, further comprising at least one controllable valve arranged in at least the first supply line, wherein the controllable valve is configured to control the flow of pressurized gaseous fuel in the first supply line.

Example 16. The gaseous fuel supply system of any of examples 1-15, wherein the pressurized gaseous fuel is pressurized hydrogen.

Example 17. A vehicle comprising the gaseous fuel supply system according to any of examples 1-16.

Example 18. The vehicle of example 16, further comprising the clean combustion engine being a hydrogen combustion engine or a hydrogen high pressure direct injection engine.

Example 19. The vehicle of any of examples 17-18, further comprising the vehicle cooling system.

Example 20. A method for transferring heat between a gaseous fuel supply system for a clean combustion engine of a vehicle, and a vehicle cooling system, the method comprising: heating, by a first heat exchanging component, pressurized gaseous fuel in a first supply line transferring gaseous fuel from a gaseous fuel tank to the clean combustion engine, by the vehicle cooling system.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as “below” or “above” or “upper” or “lower” or “horizontal” or “vertical” may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being “connected” or “coupled” to another element, it can be directly connected or coupled to the other element, or intervening elements may be present. In contrast, when an element is referred to as being “directly connected” or “directly coupled” to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. A gaseous fuel supply system for a clean combustion engine of a vehicle having a vehicle cooling system, the supply system comprising:

a gaseous fuel tank storing pressurized gaseous fuel;

at least a first supply line arranged to supply pressurized gaseous fuel from the gaseous fuel tank to the clean combustion engine;

at least a first heat exchanging component arranged in the first supply line;

wherein the first heat exchanging component is arranged to transfer heat between a cooling fluid of the vehicle cooling system and the pressurized gaseous fuel in the first supply line;

a compressor arranged in the first supply line between the first heat exchanging component and the clean combustion engine; and a second heat exchanging component arranged between the compressor and the clean combustion engine, wherein the second heat exchanging component is arranged to transfer heat between the pressurized gaseous fuel in the first supply line and the cooling fluid of the vehicle cooling system;

wherein the first and second heat exchanging components form part of a common heat exchanger.

2. The gaseous fuel supply system of claim 1, wherein the first heat exchanging component comprises a heat transfer surface being arranged to transfer heat from the cooling fluid of the vehicle cooling system to the pressurized gaseous fuel in the first supply line.

3. The gaseous fuel supply system of claim 1, wherein the first heat exchanging component is arranged as a cold temperature heat reservoir for the vehicle cooling system.

4. The gaseous fuel supply system of claim 1, further comprising a control unit configured to determine the temperature of the cooling fluid of vehicle cooling system fed to the first heat exchanging component, and to control the flow of the cooling fluid fed to the first heat exchanging component in response to that the determined temperature of the cooling fluid is above a predetermined temperature threshold.

5. The gaseous fuel supply system of claim 4, wherein the predetermined temperature threshold is set such that, in use, the cooling fluid of the vehicle cooling system transfers heat to the pressurized gaseous fuel in the first supply line via the first heat exchanging component.

6. The gaseous fuel supply system of claim 4, wherein the control unit is configured to determine the heat transfer need of the pressurized gaseous fuel in the first supply line, and to control the flow of the cooling fluid fed to the first heat exchanging component in response to the heat transfer need.

7. The gaseous fuel supply system of claim 1, wherein the second heat exchanging component comprises a heat transfer surface arranged to transfer heat from the cooling fluid of the vehicle cooling system to the pressurized gaseous fuel in the first supply line, or to transfer heat to the cooling fluid of the vehicle cooling system from the pressurized gaseous fuel in the first supply line.

8. The gaseous fuel supply system of claim 1, wherein the first and second heat exchanging components are heat exchanging tubes or heat exchanging channels.

9. The gaseous fuel supply system of claim 1, further comprising:

a second supply line arranged to supply pressurized gaseous fuel from the gaseous fuel tank to the clean combustion engine, the second supply line bypassing at least the compressor in the first supply line.

10. The gaseous fuel supply system of claim 9, further comprising:

a third heat exchanging component arranged in the second supply line, wherein the third heat exchanging component is arranged to transfer heat between the pressurized gaseous fuel in the second supply line and the cooling fluid of the vehicle cooling system.

11. The gaseous fuel supply system of claim 1, wherein the vehicle cooling system is configured to cool the clean combustion engine and a transmission of the vehicle.

12. The gaseous fuel supply system of claim 11, wherein the common heat exchanger is configured to receive coolant fluid of the vehicle cooling system, to guide the cooling fluid from the first heat exchanging component to the second heat exchanging component, or from the second heat exchanging component to the first heat exchanging component, and to discharge coolant fluid to the clean combustion engine or transmission of the vehicle.

13. The gaseous fuel supply system of claim 1, further comprising at least one controllable valve arranged in at least the first supply line, wherein the controllable valve is configured to control the flow of pressurized gaseous fuel in the first supply line.

14. The gaseous fuel supply system of claim 1, wherein the pressurized gaseous fuel is pressurized hydrogen.

15. A vehicle comprising the gaseous fuel supply system of claim 1.

16. The vehicle of claim 15, further comprising the clean combustion engine being a hydrogen combustion engine or a hydrogen high pressure direct injection engine.

17. The vehicle of claim 15, further comprising the vehicle cooling system.

18. A method for transferring heat between a gaseous fuel supply system for a clean combustion engine of a vehicle, and a vehicle cooling system, the method comprising:

heating, by a first heat exchanging component, pressurized gaseous fuel in a first supply line transferring gaseous fuel from a gaseous fuel tank to the clean combustion engine, by the vehicle cooling system, the first supply line comprising a compressor arranged between the first heat exchanging component and the clean combustion engine; and heating or cooling, by a second exchanging component arranged between the compressor and the clean combustion engine, pressurized gaseous fuel in the first supply line, by the vehicle cooling system;

wherein the first and second heat exchanging components form part of a common heat exchanger.

* * * * *